United States Patent [19]

Fergason

[11] Patent Number: 4,983,021

[45] Date of Patent: Jan. 8, 1991

[54] MODULATED RETROREFLECTOR SYSTEM

[76] Inventor: James L. Fergason, 92 Adam Way, Atherton, Calif. 94025

[21] Appl. No.: 230,781

[22] Filed: Aug. 10, 1988

[51] Int. Cl.$^5$ .............................................. G02F 1/13
[52] U.S. Cl. .................................. 350/332; 350/331 R; 350/338
[58] Field of Search ................... 350/332, 331 R, 338, 350/330, 334

[56] References Cited

U.S. PATENT DOCUMENTS

| | | | |
|---|---|---|---|
| 4,131,791 | 12/1978 | Lego, Jr. ........................ | 350/332 X |
| 4,435,047 | 3/1984 | Fergason ........................... | 350/334 |
| 4,436,376 | 3/1984 | Fergason ........................... | 350/347 E X |

Primary Examiner—Stanley D. Miller
Assistant Examiner—Huy K. Mai
Attorney, Agent, or Firm—Renner, Otto, Boisselle & Sklar

[57] ABSTRACT

A reflector system including a reflector for reflecting incident electromagnetic energy, a shutter for controlling at least one of electromagnetic energy incident on and electromagnetic energy reflected by the retroreflector, a controller for controlling the shutter to control such incident or reflected electromagnetic energy, and a coding or modulating device for causing the controller to modulate such energy according to a prescribed code. The reflector system may be used in a closed communications system and/or in a system for seeking, locating and/or identifying an object.

34 Claims, 3 Drawing Sheets

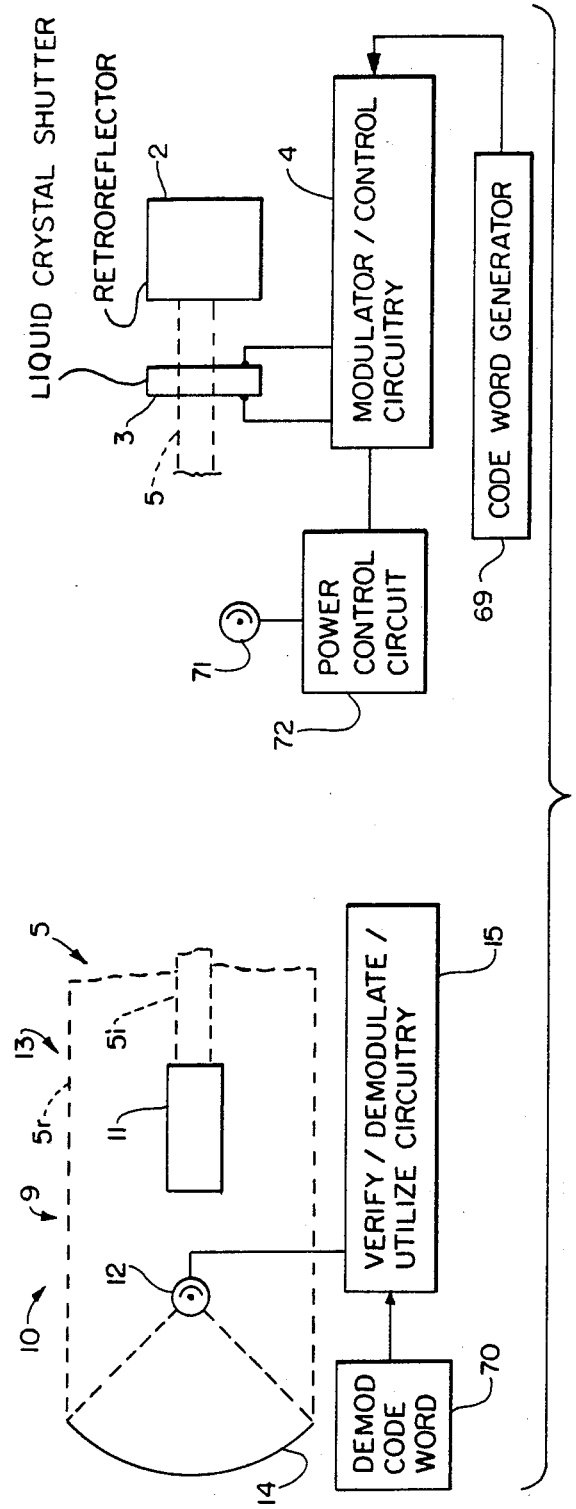
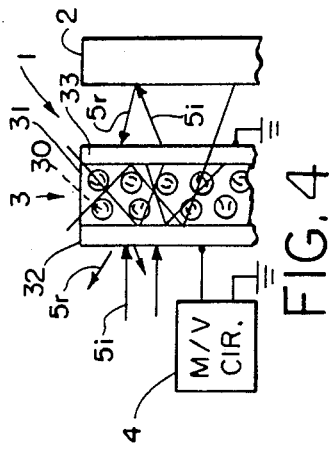
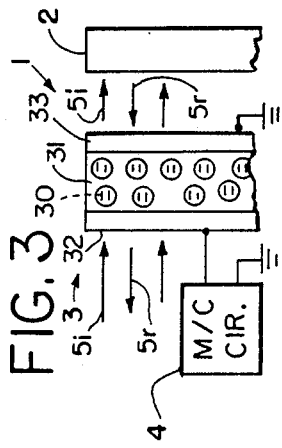

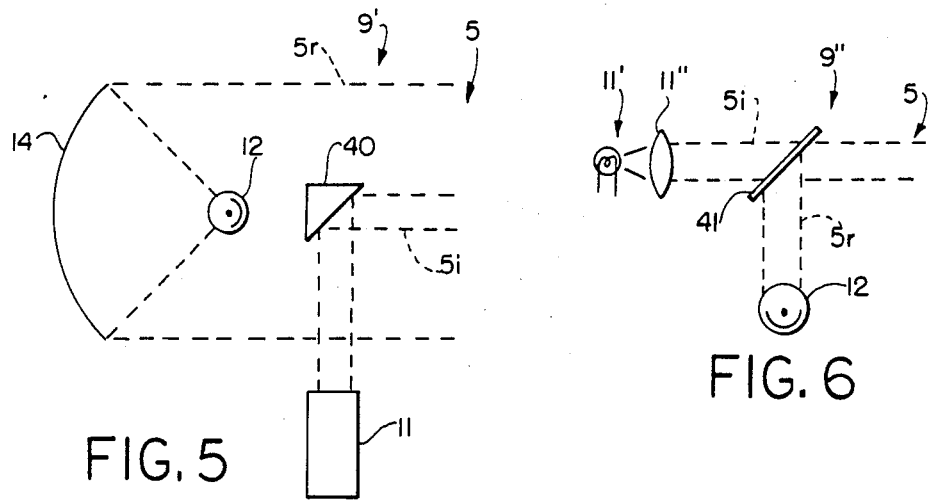
FIG. 5
FIG. 6
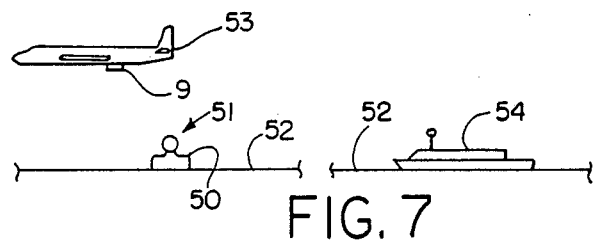
FIG. 7
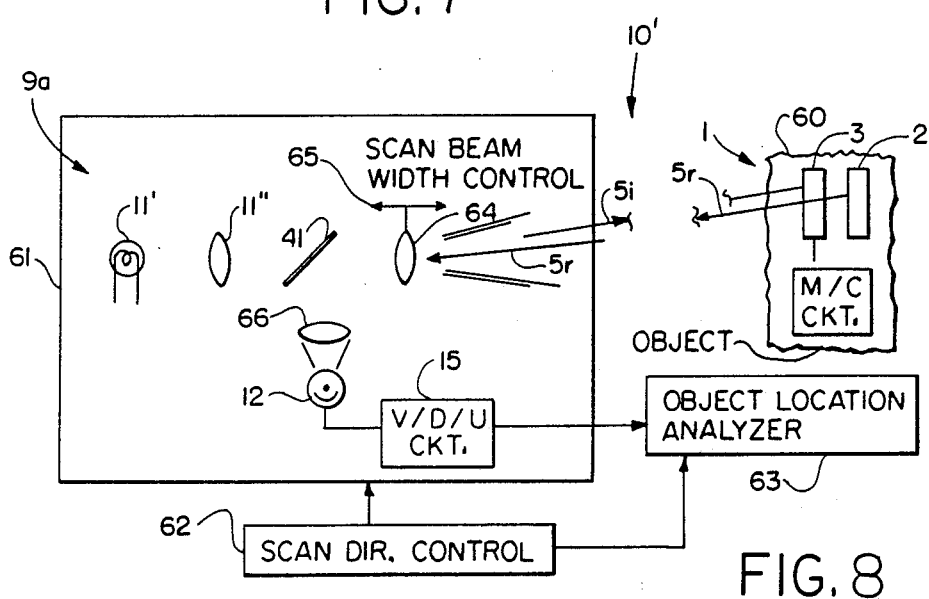
FIG. 8

MODULATED RETROREFLECTOR SYSTEM

TECHNICAL FIELD

This invention relates generally, as is indicated, to a modulated reflector apparatus and to use thereof in a system to seek, to locate and/or to identify a distant object and in a closed communications system.

BACKGROUND

To locate an object at a distance, particularly when the object is relatively small and the distance is relatively large, is difficult and sometimes is impossible or nearly impossible. For example, prompt locating of a survivor of a ship wreck in a vast body of water usually is critical, and if unsuccessful can lead to tragedy. Radios have been used in the past to signal the location of such a survivor; but radios are relatively expensive, complex and power consuming and may be somewhat ineffective in the presence of substantial wave action and/or other background noise.

A closed communication system is one in which information can be communicated in one or sometimes two directions without or with minimal possibility of that information being detected by an unauthorized individual.

Electromagnetic energy, as it is used herein, means such energy that is capable of being reflected, preferably by means of a retroreflector device. An example of electromagnetic energy includes light in the visible spectrum, infrared energy/radiation, and ultraviolet energy/radiation. The invention will be described hereinafter with respect to light in the visible spectrum; however, it is intended and it is to be understood that the invention encompasses use with electromagnetic energy that is other than visible light, as long as such electromagnetic energy is capable of reflection, more preferably, retroreflection.

In the field of optics retroreflectors are well known. The function of a retroreflector is to receive input electromagnetic energy and to reflect such energy back from whence it came along the same path it was received and preferably with the same general characteristics, relatively high gain and relatively little spreading of the light beam. One exemplary retroreflector is a corner reflector; another is one that uses plural spheres and curved reflectors associated therewith.

Shutters for controlling transmission of light also are known. One example is a mechanical shutter used to control light input to a camera. Another type of shutter is a liquid crystal shutter. Exemplary liquid crystal shutters are disclosed in U.S. Pat. Nos. 4,435,047, 4,556,289 and 4,606,611. Still another type of liquid crystal shutter is described in U.S. Pat. Nos. 4,385,806, 4,540,243, and Re32,521, which concern on surface mode switching and optical polarization phenomena. The entire disclosures of the patents mentioned herein are hereby incorporated by reference, and it will be appreciated that the shutters disclosed therein may be used in the context of the present invention. Other types of liquid crystal shutters also are known; examples include twisted nematic liquid crystal shutters and dynamic scattering liquid crystal devices.

Since the invention is disclosed in detail below with reference to light, such shutters may be referred to below as optical shutters or light shutters, although it will be appreciated that shutters used in accordance with the present invention broadly are those intended to control transmission of electromagnetic energy and would be selected according to the nature of the electromagnetic energy and the operating requirements, such as speed of response, opaqueness, etc. required for a particular system. Moreover, although according to the present invention a liquid crystal shutter is preferred to modulate light, particularly reflection of light, as is described further below, it will be appreciated that other types of shutters also may be used consistent with the invention.

Above-mentioned U.S. Pat. No. Re32,521 discloses a communications transmitting and receiving installation. At the receiving installation there is a light source, which directs light to the transmitting location, and a light demodulator. At the transmitting location the received incident light beam is modulated and is reflected back toward the demodulator of the receiving installation for detection of the modulation information. Surface mode switching of liquid crystal orientation and, thus, polarization effects are disclosed in such patent for use to impose information on the transmitted light for subsequent detection at a receiver. In one embodiment disclosed in such patent a corner reflector is used to reflect incident light to a detector. In a sense the mentioned apparatus at the transmitting location disclosed in such patent is passive in that the light source providing energy therefor need not be a part of the transmitter; rather, the transmitter receives light from a remote source and modulates and reflects the light for subsequent detection. One disadvantage to the system of the '521 patent is the need to detect polarized light, for when light travels long distances through the atmosphere substantial depolarization and, thus, signal degradation, can occur as a result of gases, particulates, dirt, etc. in the optical path.

BRIEF SUMMARY OF THE INVENTION

Fundamentally, the invention modulates and reflects light and provides for utilization of the modulated reflected light for various purposes. One exemplary purpose is to seek, to locate and/or to identify a distant object. Another exemplary purpose is to provide a closed communications system between two objects that need not necessarily be physically connected together, e.g., by wires, etc.

Briefly, the invention includes the combination of a modulated reflector system having a retroreflector for reflecting incident light and a shutter for modulating at least one of light incident on and light reflected by the retroreflector, and a detector tuned to the nature of such modulation of the light for detecting the modulated light.

Consistent with the foregoing, a preferred embodiment provides for modulation of both the incident and the retroreflected light. Also, consistent with a preferred embodiment the invention takes advantage of conjugate optics so that refraction and other effects on the the incident light also act on the retroreflected light to facilitate alignment and detection, as will be described further below. Still further, the invention preferably utilizes a light shutter that selectively transmits or scatters light independently of optical polarization so that the optical signals detected are independent of polarization and various problems associated with polarization, e.g. signal degradation, etc., as are mentioned elsewhere herein.

In one embodiment light from a source is scanned over an area with the intent that the light would impinge onto a distant object that is to be detected. Associated with the distant object are a reflector and a shutter that modulates light incident on the reflector, light reflected by the reflector and/or both incident and reflected light. A detector detects the reflected light, and a circuit, such as a demodulator, senses whether the detected light is modulated according to that modulation intended to be caused by the shutter, e.g., for identification purposes. Preferably the reflector is a retroreflector, although other reflectors that will work to carry out the principles of the invention also may be used in the various embodiments disclosed herein. Particularly with a retroreflector, though, light from the source that is incident on the shutter and retroreflector will be reflected directly back toward the source, will be relatively bright to facilitate discerning the same from background, and will travel essentially the identical path as the incident light according to the principles of conjugate optics and reversibility of optical systems. Accordingly, there will be minimal beam spread along the reflected light path to assure reception at a detector that is located at the source. In such case the detector is positioned relative to the source, e.g. proximate thereto, to receive light in the retroreflected light path. From information indicating the direction to which incident light is directed, the location of the distant object can be determined.

According to another embodiment of the invention a closed communications system includes a light source, a modulated retroreflector and a detector system which includes a detector and a demodulator circuit to sense the nature of any modulation on the detected light and/or to determine whether or not the signal detected by the detector has the correct modulation. Moreover, coding means may be provided to control the modulator of the modulated retroreflector to cause modulation according to a specific coding information; and in such case the demodulation circuit is able to determine whether the signal detected by the detector contains the correct coding information.

In addition to temporally modulating light, the invention may include spatial modulation, e.g., using a hologram. In such case spatial demodulation may be provided at the detector, e.g., using plural light sensitive detectors at relative locations to determine if the reflected signal has the correct spatial modulation characteristics.

The invention may be used with various types of retroreflectors and, depending on circumstances, with other types of reflectors. One other reflector is a concave reflector that provides gain greater than that provided by a planar reflector in order to assure adequate modulated light signal reaches the detector for detection.

These and other objects, advantages, features and aspects of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed. The scope of this application is to be determined by the claims and equivalents thereof.

BRIEF DESCRIPTION OF THE DRAWINGS

In the annexed drawings:

FIG. 1 is a schematic illustration of a detector system using a modulated shutter and retroreflector system according to the present invention;

FIG. 2 is a schematic circuit diagram depicting an exemplary modulator/control circuitry for use in the modulated shutter and retroreflector system of the invention;

FIGS. 3 and 4 are schematic illustrations of the modulated shutter and retroreflector system of the invention, respectively, in light transmissive mode and in light scattering mode;

FIGS. 5 and 6 are partial schematic illustrations of alternate light source/detector systems for use in the detector system of the invention;

FIG. 7 is a schematic illustration of a rescue system utilizing the modulated shutter and retroreflector system of the invention;

FIG. 8 is a schematic illustration of an enhanced modulated shutter and retroreflector system including beam width control and scan control capabilities, such system particularly being useful in the embodiment of FIG. 7;

DESCRIPTION OF THE PREFERRED EMBODIMENT

Figure 9:
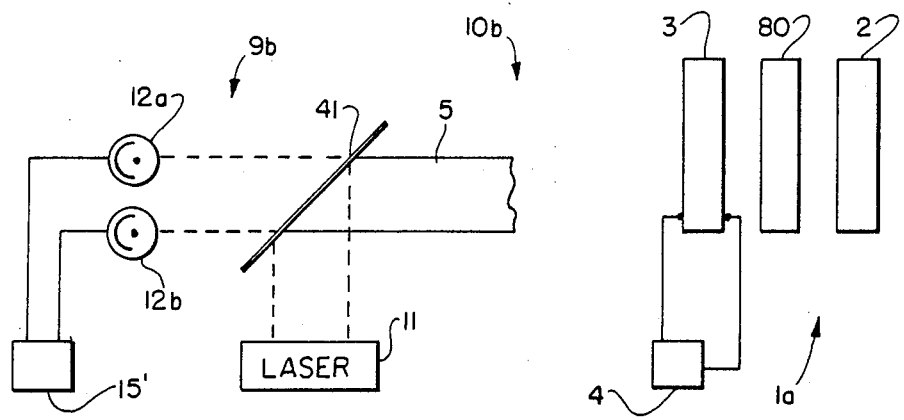
FIG. 9 is a schematic illustration of a modified system according to the invention using both temporal and spatial modulation features.

Referring, now, in detail to the drawings, wherein like reference numerals designate like parts in the several figures, and initially to FIG. 1, a modulated reflector system in accordance with the present invention in generally indicated at 1. The modulated reflector system 1 includes a reflector 2 for receiving and reflecting incident light and a shutter 3 for controlling, modulating or otherwise affecting light incident on the reflector 2, light reflected by the reflector 2, or, preferably, both incident and reflected light. Associated with or included as part of the system 1 is modulator/control circuitry 4, which is operative to provide input to the shutter 3 to operate the same to modulate light.

Preferably the reflector 2 is a retroreflector of known type. A retroreflector is a reflector that is operative generally to reflect light back along the incident light path, for example, regardless of the direction and angle of the incident path relative to the operative reflective surfaces of the retroreflector and, of course, within the operative characteristics, e.g., incident angles, of the reflective surfaces. It will be appreciated that other types of reflectors, such as a planar reflector, a focusing reflector, etc., also may be used in accordance with the principles of the present invention to achieve the desired operative functions described herein.

Preferably, too, the shutter 3 is a liquid crystal shutter that is operative, on the one hand, to transmit incident light and, on the other hand, to scatter, to block, or in any event to reduce or to stop the direct transmitting of the light received thereby, for example, to and/or from the reflector 2. Various types of light transmitting and/or scattering or otherwise attenuating liquid crystal shutters are known, such as those disclosed in the above-mentioned U.S. patents; and these may be used in the present invention. Moreover, it will be appreciated that other types of liquid crystal shutters, such as twisted nematic shutters, dynamic scattering devices, and other shutters that are not of the liquid crystal type but which can be operative to provide the functions described herein also may be used in accordance with the invention.

As is seen in FIG. 1, the reflector 2 is in the light path 5, which represents both the incident and reflected light. The shutter 3 likewise is in the light path 5 to modulate both the incident and reflected light. If desired, though, an arrangement of the reflector 2 and shutter 3 may be made, and is to be considered part of the invention, in which the shutter would not be in both the incident and reflected light paths. For example, if the reflector 2 were such that as light would traverse the reflector in a light path that is somewhat circuitous or other than totally reversible before arriving on course in overlapping parallel relationship with the incident light, although in reverse direction, the shutter could be being placed in and along the circuitous route to modulate the light as it is transmitted through the shutter only in one direction.

The modulation/control circuitry 4 produces an output, e.g., to cause the shutter 3 to modulate light according to such output. For example, such output may be an AC voltage that only is periodically amplitude modulated on and off. Such AC voltage may be delivered to the shutter to provide a pulsating electric field that causes the shutter to transmit or to scatter light.

An example of a scattering/transmitting shutter 3 with a retroreflector is shown in FIGS. 3 and 4. An example of a circuit for driving the shutter to modulate light is shown in FIG. 2. These examples are described further below.

In operation of the modulated reflector system incident light is received along light path 5 in a direction from left to right relative to the exemplary illustration in the FIG. 1. The incident light is modulated by the shutter 3 according to the modulation function derived from the circuitry 4. The modulated incident light passes to the reflector 2 where it is reflected back toward the shutter 3. The reflected modulated light passes through the shutter 3 along light path 5, this time in a direction from right to left relative to FIG. 1.

The modulated reflector system 1 may be used in a detector system 10, which is illustrated in FIG. 1. The detector system 10 includes a light source 11, such as a laser, and a detector 12, such as a photosensor, photocell, photodiode, or other means to detect the electromagnetic energy reflected by the reflector 2. The light source 11/detector 12 system combination 13 and the modulated reflector system 1 may be remotely located relative to each other and coupled only by light along the light path 5. There usually is some light beam spread between the incident light 5i and the received reflected light 5r, which is somewhat exaggerated in FIG. 1. Desirably, though, such beam spread is minimized in order to increase the range of the invention for detecting objects at remote locations.

In order to take advantage of conjugate optics and reversibility principles, incident light 5i from the source 11 toward the modulated reflector system 1 along light path 5 and reflected light 5r from the system 1 is directed back also along light path 5 to the detector 12. A reflector 14 collects the reflected light 5r and directs it to the detector 12. Associated with or included as part of the system 10 is verify/demodulate/utilize circuitry 15, which is operative to detect whether the reflected light received by the detector 12 is modulated according to the modulation that the system 1 is intended to effect on the light.

The reflector 2 and shutter 3 preferably are physically positioned in relatively close proximity. This positional relationship facilitates mounting the two to impact on light as is described herein and assures that the operation of the shutter will be essentially the same on the incident and reflected light, even though the speed of the light ordinarily would be expected to be significantly faster than the speed of operation of the shutter.

The modulator/control circuitry 4 provides electrical input to the shutter 3 to cause the latter to modulate light. An exemplary input is electric field. For example, by periodically applying electric field to cause the shutter to transmit light and removing electric field from the shutter 3 to cause scattering of light, modulation can be achieved. The circuitry 4 may be used to provide other types of inputs to the shutter 3, depending on the nature of the shutter and the desired modulation. In one example, the circuitry 4 may include a chopper, flip-flop, astable or free running multivibrator type of circuit with appropriate amplifiers, timing components, driving circuitry, power supply, etc. that is operative periodically to apply a voltage to the shutter 3 or to modulate a carrier wave, such as an ac signal, to generate an appropriate electric field and then to remove such voltage and, thus, the field with respect to the shutter 3.

Light modulation effected by the shutter 3 and circuitry 4 may be regular periodic modulation at a prescribed frequency, e.g. each cycle including a portion during which light is transmitted without scattering and another portion during which light is scattered. When light is scattered, relatively little, if any, reflected light is transmitted back along the path 5. Although during the scattering portion of each cycle some reflected light may travel along the path 5 and arrive at the detector 12 as reflected light 5r, the amount or intensity of that reflected light is minimal compared to the amount or intensity when the shutter is not scattering. In the case just described the circuitry 4 may be, for example, a free running multivibrator circuit which periodically applies and does not apply electrical input to the shutter 3.

Alternatively, the circuitry 4 may be operative to provide a specific coded nature of the modulation effected by the shutter 3. Such coded modulation may be a change in the frequency of a periodic modulation. Also, the circuitry may be operative to code the modulation allowing the shutter to be in one operative mode (say transmitting) for a period of time and in the other operative mode (say scattering) for a different period of time. Further, the coding may be such that one or different code words are generated and repeated, e.g., as in Morse code or the like, whereby one or a series of short one operative mode condition of the shutter and one or a series of relatively longer other operative mode condition of the shutter could be sequentially achieved to generate a prescribed code word. Additionally, the coding may be in the form of a specific data word representing logic 1 and logic 0 signal levels, as a byte of digital data is used in a computer.

The circuitry 4 may include a computer to select the code word and/or otherwise to select the nature of the modulation effected by the shutter 3. Thus, the circuitry 4 may include various devices or means that are able to generate an output voltage that periodically varies, e.g. on and off, as a train of digital pulses. The digital pulses may be amplified and applied to the shutter 3 to cause appropriate electric field to operate the shutter in respective transmitting/scattering functions, for example.

Briefly referring to FIG. 2, an exemplary modulator/control circuitry 4 is illustrated. The circuitry 4 includes an input terminal 20 to which a prescribed input signal is applied. Such prescribed input signal, as was mentioned above, may be an ac signal, a pulsating dc signal, e.g. as in a coded serial digital word that continually repeats, etc. Such prescribed input signal, as is described further below, also may be representative of an audio signal. The prescribed input signal is delivered to an amplifier 21, which preferably has an offset capability associated therewith. The offset capability may be of conventional design. As is illustrated, the offset capability, at least in part, is provided by a capacitor 22, which is coupled to a voltage source V, e.g. a 30 volt dc supply. By providing an offset voltage to the output from the amplifier 21, the speed of response of at least certain types of liquid crystal shutter 3, such as the one illustrated in FIGS. 3 and 4, has been found to be expedited and the responsiveness of the liquid crystal shutter to specific variations in the driving signal thereto has been found to be enhanced.

The verify/demodulate/utilize circuitry 15 of FIG. 1 preferably is able to discern the nature of the light signals received and detected by the detector. For example, if the modulator/control circuitry 4 were a free running multivibrator that produced a pulsed dc signal of a prescribed frequency, the circuitry 15 would include conventional detection circuitry to sense whether the signal applied thereto is of such prescribed frequency. An affirmative indication by the circuitry 15, then, may be used to confirm both that optical coupling had been made with the system 1 and that the system 1 is of a prescribed identity or is associated with another object that is of a prescribed identity.

Therefore, the verify/demodulate/utilize circuitry 15 can be used to verify that in fact a signal of reflected light 5r is being received by the detector 12. Circuitry 15 also can demodulate such signal to detect the nature of the modulation thereof and whether such modulation follows a prescribed format, frequency, coding, etc. Further, the circuitry 15 may utilize the received signal to provide specific output functions, information or the like. An examplary output function may be to provide a visual signal or a signal to a computer to indicate that a specific remote object has been located and identified. Exemplary output information may be the nature and/or the location of the remote object.

An example of liquid crystal shutter 3 is illustrated in FIGS. 3 and 4. The shutter 3 includes plural volumes of operationally nematic liquid crystal material 30 in a transparent containment medium 31, such as a resin, polymer, polyvinyl alcohol, epoxy, or other material that contains the liquid crystal material in a plurality of volumes. A pair of transparent electrodes 32, 33 at opposite sides of the liquid crystal material/containment medium combination are coupled to receive electrical input, e.g., a voltage, from the modulator/control circuitry 4, to apply a corresponding electric field across the liquid crystal material/containment medium combination. The liquid crystal material 30 preferably has positive dielectric anisotropy and an ordinary index of refraction that matches the index of refraction of the containment medium 31. Therefore, as is illustrated in FIG. 3, when electric field is applied, the liquid crystal structure aligns with the field and light incident on the shutter 3 is transmitted through to the reflector 2 and reflected light from the reflector is transmitted back through the shutter 3 for subsequent transmission to the detector 12. The liquid crystal material 30 also may have an extraordinary index of refraction which is different from the index of refraction of the containment medium 31. Therefore, in the absence of the electric field (or of an electric field that is adequate to cause the aforementioned alignment), the liquid crystal structure tends to assume a more random alignment or distorted alignment, thereby resulting is scattering of light incident on the shutter 3 from either side thereof. The degree of scattering may be a function of capsule size, differences between the extraordinary index of refraction of the liquid crystal and the containment medium, thickness of the liquid crystal and containment medium layer of the shutter, and so on. A more detailed description of such a shutter 3 is presented in the above-mentioned U.S. Pat. Nos. 4,435,047 and 4,606,611. Also, as was mentioned above, other types of shutters also may be used in accordance with the invention.

Turning to FIG. 5, a modified source/detector system 9' for use, for example, in the system 10 of FIG. 1, is illustrated. The system 9' includes components similar to those illustrated and described above with respect to FIG. 1, such parts being designated with the same reference numerals. However, the incident light path 5i is bent or folded using a prism reflector 15 located in the light path 5. A particular advantage to the system 9' is that the prism 40 may be smaller in cross section across the path of the reflected light 5r than is the actual light source 11 and, thus, blocks less of the reflected light intended to be directed by the reflector 14 to the detector 12.

A further alternate source/detector system 9" is illustrated in FIG. 6. The system 9" is similar to the systems 9, 9' except that a beam splitter or semitransparent reflector 41 is located in the light path 5 to enable the incident light and the reflected light accurately to be directed to and received from the liquid crystal shutter with a relatively narrow beam spread in both directions. Alternatively, in the event that the beam spread is larger than that illustrated in FIG. 6, a further modification of the system 9' could be made to bring it into line with the system 9' illustrated in FIG. 5. In this latter case, essentially the beam splitter 41 may be substituted for the prism 40, and the locations of the light source 11' and the detector 12 may be reversed relative to the FIG. 6 illustration. Notably, too, the embodiment illustrated in FIG. 6 envisions use of a light source 11' that is different from the laser 11, for example, being in the form of an incandescent light source or some other light source. If desired, a lens 11" may be used to collimate or otherwise to collect the light emanating from the source 11' and directing it as incident light 5i along the path 5 to the liquid crystal shutter.

It will be appreciated that other forms of light source/detector systems may be used equivalently for the various systems 9 illustrated and described herein.

The modulated reflector system 1 of the present invention may be used to locate and to identify a distant object. As is illustrated in FIG. 7, such distant object may be, for example, a person, a vessel, or some other thing on which the modulated reflector system 1 is mounted or used. In the illustrated example, the modulated reflector system is mounted on a life jacket 50 by a person 51 who is floating in a body of water 52, or is in a life boat, etc. The source/detector system 9 of the invention may be carried by an aircraft, sattelite, or even a ship. In FIG. 7 such system 9 is carried by an aircraft 53. The system 9 directs incident light toward the body of water 52 and preferably scans the body of water over a relatively broad path. In the event that such incident light impinges on the modulated retroreflector life jacket 50, or other device in which modulated retroreflector is mounted, the retroreflected light reflected to the system 9 is detected and is demodulated to verify that, in fact, the person has been located. Preferably, the modulation frequency of the shutter 3 is different from the average background noise that may occur during floating in the water, due to wave action or the like. After the person has been located, a signal can be sent to the aircraft 53 to a rescue ship 54 to effect a prompt rescue. The detector system 10, including the modulated reflector system 1 and the source/detector system 9, may be used to seek, to detect, to locate, and to identify various other objects.

A modified system 10' for detecting, identifying and locating a distant object 60 is illustrated in FIG. 8. Mounted on the object 60 or otherwise fixed with respect to the object 60 is a modulated reflector system 1 as was described above. The source/detector system 9a, which is similar to the various systems 9, 9', 9" described above, is mounted on a movable support 61 that can be moved or scanned to direct the incident light 5i in a variety of directions. Such support 60 may be, for example, a table or plate that is mounted on various gimbles, bearings, pivots, etc., to achieve the particular movement capability desired. Movement of the support 61 enables scanning of the incident light 5i over a wide variety of directions. A scanned direction control 62 may include electronic circuitry and/or motors, etc., that effect movement of the support 61 in a conventional fashion. An object location analyzer 63 is coupled to the scan direction control 62 and to the verify/demodulate/utilize circuitry 15. When the circuitry 15 senses that the object 60 in fact has been detected, the object location analyzer can fix the location of the object as a function of the direction that the scan direction control 62 has caused the support 61 and system 9a to direct incident light 5i. Thus, the object location analyzer 63 may be any of a variety of conventional devices that provide signal output information representative of direction or position, such as resolvers, linear variable differential transformers, and/or a variety of other conventional position detector devices.

In the system 9a of FIG. 7, a light source 11' directs light through a lens 11" and then through a beam splitter 41. The lens 11" may be other than a true collimating lens and may cooperate with a further adjustable lens 64 to determine the width of the scanning beam of incident light 5i. A manual or automatic position adjusting mechanism 65 may be employed to adjust the location of the lens 64 relative to the lens 11" in order to determine such scanned beam width. The scanned beam width control mechanism may include, for example, conventional devices used in photographic and video camera technology, such as zoom lenses and the like. The detector 12 receives the reflected light 5r that has been retroreflected by the reflector 2 and modulated by the modulator 3. Such light is received via the lens 64, beam splitter 41 and a further lens 66, which may be provided to focus light or otherwise to collect light to send it to the detector 12. It will be appreciated that a detector system 10' illustrated in FIG. 8 may be used, for example, in an environment, such as that illustrated in FIG. 7, or in some other environment in which it is intended to seek, to locate, and/or to identify a distant object.

Briefly referring back to FIG. 1, a code word generator 69 may be employed to apply a code word to the modulator/control circuitry 4 in order to cause the latter to effect modulation of the liquid crystal shutter 3 in accordance to a prescribed code, such as a secret code that may change periodically. The same code word may be delivered in the source/detector system 9 by coupling a demodulate code word device 70 to the verify/demodulate/utilize circuitry 5. The demodulate code word device 70 may be, for example, a device that provides in a sense a filtering function or a comparing function or a signal that can be compared in the demodulator portion of the circuitry 15 to determine whether the light received by the detector 12 in fact is modulated according to the prescribed code word generated by the code word generator 69. Using such technique, the code words may be changed periodically both at the system 9 and at the system 1, e.g., according to a prescribed plan. The detector system 10 then may be used for the purpose of locating a distant object on which the modulated liquid crystal shutter system 1 is mounted and identifying whether or not that object is friendly.

Still further, if desired, the modulated liquid crystal shutter system 1 may be maintained in a relatively dormant condition until specifically interrogated. Such interrogation may be in the form of the directing of the incident light 5i onto a specific photosensor 71, which indicates detection of such incident light to the power control circuit 72. The power control circuit may simply be a circuit that energizes the modulator/control circuitry 4 to operate the liquid crystal shutter 3 to carry out its modulation function for a prescribed period of time after the interrogating beam has been directed onto the detector 71. A time-out circuit may be provided in the power control circuit 72 to shut down the modulator/control circuitry for a prescribed period of time after the last interrogation has occurred. The detector 71 may be a radio antenna or another equivalent device capable of being interrogated remotely from the system 9 to power up the modulator/control circuitry 4 and/or otherwise to energize the system 1.

A modified modulated reflector system 1a is shown in FIG. 9. the system 1a includes a retroreflector 2, a liquid crystal modulator 3, and modulator/control circuitry 4, as were described above. The modulator 3 effects temporal modulation of the light. The system 1a also includes a hologram 80 that is constructed in a conventional way as to provide spatial modulation of the light. For example, the hologram may be in the form of a prescribed spatial pattern according to which the plural detectors 12a, 12b may be relatively positioned in the source/detector system 9b of the modified detector system 10b. Therefore, in order for the verify/demodulate/utilize circuitry 15 correctly to identify the modulated reflector system 1a, it is necessary for the temporal modulation to be correct and for the relationship of the optical patterns directed to the detectors 12a, 12b to be correct.

Figure 10:
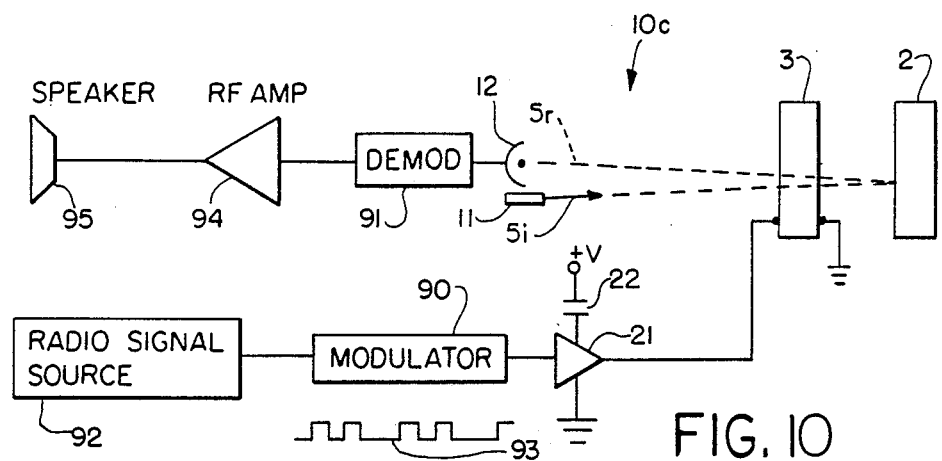
FIGS. 10 and are alterternate embodiments of the present invention used to impose a prescribed type of modulation on the light by the modulated reflector system, in particular such modulation being in the form of an audible type signal or a signal that can be converted to audible, e.g. a radio frequency signal.
Figure 11:
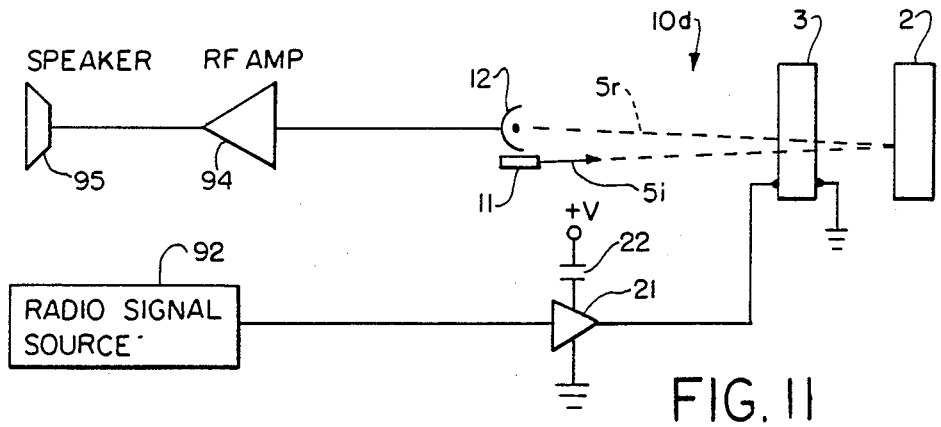

In FIGS. 10 and 11 are alternate embodiments of a detector system 10c, 10d in accordance with the present invention used in connection with an audio or radio frequency signal for modulating the light by the liquid crystal shutter. The systems 10c, 10d are the same except in the former there is provided a modulator 90 which modulates the signal from the radio signal source and a demodulator 91, which demodulates the signal received by the detector 12 according to a function that is coordinated, e.g., the same, as the modulation function provided by the modulator 90.

In the systems 10c, 10d, a radio frequency signal source 92, such as a connection from a conventional a.m. or f.m. radio, e.g., that signal which when amplified would drive the radio speaker, is delivered to the amplifier 21 of the modulator/control circuitry 4, which was described above with respect to FIG. 2. In the case of the system 10c, such radio signal source is modulated according to the modulation function imposed thereon by the modulator. An exemplary repeated modulation function is represented at 93 in FIG. 10. The amplifier 21 provides a modulator driving signal to the liquid crystal shutter 3 to drive the shutter according to the nature of the radio signal.

The shutter 3 modulates incident light 5i from the laser source 11 and reflected light 5r reflected by the retroreflector 2 according to such radio signal. The detector 12 detects the modulated reflected light. It is intended that the signal from the detector 12 be amplified by a radio frequency amplifier 94 and then delivered to a conventional speaker, ear phone or the like indicated at 95 to produce an audible output signal. In the case of the detector system 10c, the demodulator functions such that if the demodulator does not detect the modulation provided by the modulator 90, then any radio frequency signal or other signal received by the detector 12 would not be passed to the radio frequency amplifier 93.

I claim:

1. A reflector system, comprising
a reflector for reflecting incident electromagnetic energy,
a shutter for controlling at least one of electromagnetic energy incident on and electromagnetic energy reflected by said reflector, said shutter comprising a field effect scattering type liquid crystal shutter including plural volumes of liquid crystal material in a containment medium
a controller for controlling said shutter to control such incident or reflected electromagnetic energy, and
coding means for causing said controller to modulate such energy according to a prescribed code.

2. The system of claim 1, said reflector comprising a retroreflector.

3. The system of claim 1, wherein said containment medium affects the structural alignment of the liquid crystal in the absence of a prescribed input thereto, said liquid crystal having positive dielectric anisotropy, an ordinary index of refraction matched to the index of refraction of said containment medium to transmit light in the presence of a prescribed input and an extraordinary index of refraction different from the index of refraction of said containment medium to scatter light in the absence of a prescribed input.

4. The system of claim 1, said controller comprising electrodes.

5. The system of claim 4, said controller comprising circuit means for applying AC electrical input to said shutter.

6. The system of claim 1, said coding means comprising timing circuit means for producing a temporal output signal for causing said shutter to effect temporal modulation of said electromagnetic energy.

7. The system of claim 6 said coding means comprising means for operating said shutter to modulate said electromagnetic energy according to a signal representing sound.

8. A reflector system, comprising
a reflector for reflecting incident electromagnetic energy,
a shutter for controlling at least one of electromagnetic energy incident on and electromagnetic energy reflected by said reflector,
a controller for controlling said shutter to control such incident or reflected electromagnetic energy,
coding means for causing said controller to modulate such energy according to a prescribed code, and
said shutter comprising a surface mode liquid crystal cell.

9. A closed communications system, comprising a source of electromagnetic energy,
retroreflector means for receiving and reflecting such electromagnetic energy,
modulator means at a location separated from said source for modulating such electromagnetic energy, said modulator means including a liquid crystal shutter comprising plural volumes of liquid crystal material in a containment medium,
detector means at a location separated from said retroreflector means for detecting such electromagnetic energy, and
demodulator means for demodulating the response of said detector means to such electromagnetic energy.

10. The system of claim 9, said source comprising a laser.

11. The system of claim 9, said retroreflector means comprising a corner reflector.

12. The system of claim 9, said modulator means comprising means for effecting temporal modulation.

13. The system of claim 12, said demodulator means comprising means for decoding temporal modulation.

14. The system of claim 12, wherein said containment medium affects the structural alignment of the liquid crystal in the absence of a prescribed input thereto, said liquid crystal having positive dielectric anisotropy, an ordinary index of refraction matched to the index of refraction of said containment medium to transmit light in the presence of a prescribed input and an extraordinary index of refraction different from the index of refraction of said containment medium to scatter light in the absence of a prescribed input.

15. The system of claim 9, wherein said containment medium affects the structural alignment of the liquid crystal in the absence of a prescribed input thereto, said liquid crystal having positive dielectric anisotropy, an ordinary index of refraction matched to the index of refraction of said containment medium to transmit light in the presence of a prescribed input and an extraordinary index of refraction different from the index of refraction of said containment medium to scatter light in the absence of a prescribed input.

16. The system of claim 9, further comprising reflector means for receiving reflected electromagnetic energy from such retroreflector and for concentrating such energy at said detector means.

17. A system for seeking and locating a distant object, comprising:
   directing means for directing incident electromagnetic energy toward an area to seek such object,
   detector means for receiving electromagnetic energy reflected from such object,
   retroreflector means positioned with respect to said object for reflecting incident electromagnetic energy from said directing to said detector means,
   modulator means for modulating at least one of the electromagnetic energy incident on and reflected by said retroreflector means, said modulator means including a liquid crystal shutter comprising plural volumes of liquid crystal material in a containment medium, and
   demodulator means coupled with respect to said detector means for determining whether electromagnetic energy detected by said detector means is modulated according to the modulation caused by said modulator means.

18. The system of claim 17, said directing means comprising a light source.

19. The system of claim 17, said detector means comprising a photodetector.

20. The system of claim 17, said retroreflector being mounted on such object.

21. The system of claim 17, wherein the path of light incident on and the path of light reflected by said retroreflector are at least substantially the same, and wherein said modulator means is operative to modulate both incident and reflected light.

22. The system of claim 21, wherein said containment medium affects the structural alignment of the liquid crystal in the absence of a prescribed input thereto, said liquid crystal having positive dielectric anistropy, an ordinary index of refraction matched to the index of refraction of said containment medium to transmit light in the presence of a prescribed input and an extraordinary index of refraction different from the index of refraction of said containment medium to scatter light in the absence of a prescribed input.

23. The system of claim 21, wherein such object may be in an environment that produces background modulation at a generally constant frequency, and said modulator means is operative to modulate such electromagnetic energy at a frequency different from such background modulation.

24. The system of claim 17, wherein such object is a life vest, and said retroreflector and modulator are mounted with respect to such life vest.

25. A closed communications system, comprising:
   a source of electromagnetic energy,
   retroreflector means for receiving and reflecting such electromagnetic energy,
   modulator means at a location separated from said source for modulating such electromagnetic energy, said modulator means comprising means for effecting spacial modulation,
   detector means at a location separated from said retroreflector means for detecting such electromagnetic energy, and
   demodulator means for demodulating the response of said detector means to such electromagnetic energy.

26. The system of claim 25, said demodulator means comprising means for decoding spacial modulation.

27. The system of claim 26, said means for decoding spacial modulation comprising plural photodetectors positioned to detect respective peaks in received optical signal.

28. The system of claim 26, said means for decoding spacial modulation comprising at least one photodetector operative to scan the space across light is received thereby to determine the nature of spacial modulation of such received light.

29. The system of claim 25, said means for effecting spacial modulation comprising a hologram.

30. A closed communications system, comprising:
   a source of electromagnetic energy,
   retroreflector means for receiving and reflecting such electromagnetic energy,
   modulator means at a location separated from said source for modulating such electromagnetic energy,
   detector means at a location separated from said retroreflector means for detecting such electromagnetic energy,
   demodulator means for demodulating the response of said detector means to such electromagnetic energy,
   means for interrogating said modulator means with a first signal having prescribed characteristics, and
   sensing means for sensing the occurrence of such first signal to energize said modulator means to effect prescribed modulating function.

31. The system of claim 30, said means for interrogating comprising means for directing light along a light path toward said modulator means, said sensing means being positioned at said modulator means for detecing the presence of such first signal, and said source and retroreflector means also being positioned to direct light along said light path.

32. A system for seeking and locating a distant object, comprising:
   directing means for directing incident electromagnetic energy toward an area to seek such object, said directing means comprising a lens system for directing ambient light toward such area,
   detector means for receiving electromagnetic energy reflected from such object,
   retroreflector means positioned with respect to said object for reflecting incident electromagnetic energy from said directing to said detector means,
   modulator means for modulating at least one of the electromagnetic energy incident on and reflected by said retroreflector means, and
   demodulator means coupled with respect to said detector means for determining whether electromagnetic energy detected by said detector means is modulated according to demodulation caused by said modulator means.

33. A system for seeking and locating a distant object, comprising:
   directing means for directing incident electromagnetic energy toward an area to seek such object,
   detector means for receiving electromagnetic energy reflected from such object,
   retroreflector means positioned with respect to said object for reflecting incident electromagnetic energy from said directing to said detector means,
   modulator means for modulating at least one of the electromagnetic energy incident on and reflected by said retroreflector means, demodulator means coupled with respect to said detector means for determining whether electromagnetic energy detected by said detector means is modulated according to the modulation caused by said modulator means, and scan control means for scanning said directing means to direct incident electromagnetic energy toward a plurality of areas to detect such object.

34. The system of claim 33, further comprising analyzer means for determining the location of such object as a function of the scan direction and the signal received by said detector means.

* * * * *